United States Patent
Wenzel et al.

(10) Patent No.: US 6,840,678 B2
(45) Date of Patent: Jan. 11, 2005

(54) DEFLECTION ADJUSTMENT ROLL

(75) Inventors: Reinhard Wenzel, Krefeld (DE); Peter Dornfeld, Krefeld (DE)

(73) Assignee: Voith Paper Patent GmbH, Heidenheim (DE)

(*) Notice: Subject to any disclaimer, the term of this patent is extended or adjusted under 35 U.S.C. 154(b) by 38 days.

(21) Appl. No.: 10/132,564

(22) Filed: Apr. 26, 2002

(65) Prior Publication Data

US 2002/0168123 A1 Nov. 14, 2002

(30) Foreign Application Priority Data

May 10, 2001 (DE) ................................ 101 22 649

(51) Int. Cl.[7] .............................................. F16C 33/66
(52) U.S. Cl. ..................... 384/464; 384/465; 384/473
(58) Field of Search ................................ 384/464, 465, 384/473, 485, 476

(56) References Cited

U.S. PATENT DOCUMENTS 4,048,701 A   9/1977   Marchioro

FOREIGN PATENT DOCUMENTS

| DE | 2920528 | 11/1980 |
|---|---|---|
| DE | 3526283 | 1/1989 |
| DE | 92181511 | 8/1992 |
| DE | 4202373 | 4/1993 |
| DE | 3607729 | 6/1995 |
| GB | 2302580 | 1/1997 |

*Primary Examiner*—Lenard A Footland
(74) *Attorney, Agent, or Firm*—Greenblum & Bernstein, P.L.C.

(57) ABSTRACT

Deflection adjustment roll and process of operating deflection adjustment roll. Deflection adjustment roll includes a yoke, antifriction bearings, which are lubricated with a liquid, a roll jacket which is pivotably coupled to the yoke via the antifriction bearings, and a sealing arrangement coupled to a coolant supply. A first disposal path is structured and arranged to guide a lubricant stream from the antifriction bearing, and a second disposal path, which is separate from the first disposal path, is structured and arranged for guiding a coolant stream from the sealing arrangement.

18 Claims, 2 Drawing Sheets

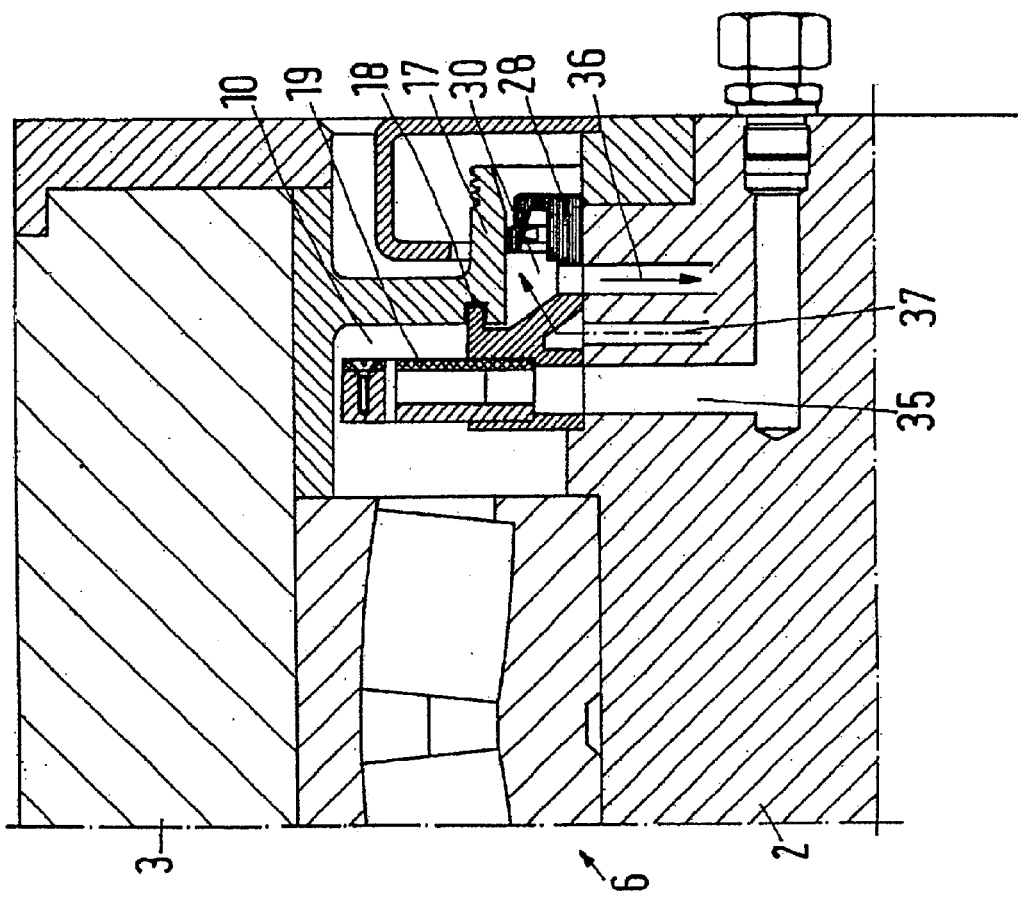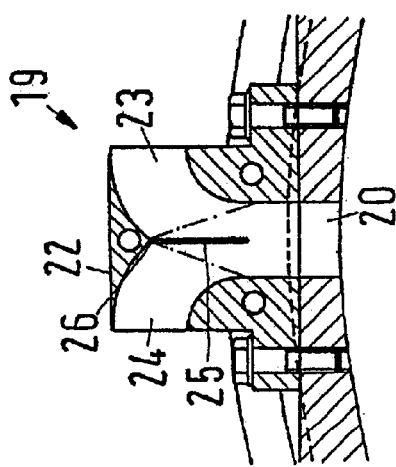

DEFLECTION ADJUSTMENT ROLL

CROSS-REFERENCE TO RELATED APPLICATIONS

The present application claims priority under 35 U.S.C. § 119 of German Patent Application No. 101 22 649.7, filed on May 10, 2001, the disclosure of which is expressly incorporated by reference herein in its entirety.

BACKGROUND OF THE INVENTION

1. Field of the Invention

The present invention relates to a deflection adjustment roll with a roll jacket which is pivoted on a yoke with the aid of antifriction bearings lubricated with liquid, with a sealing arrangement with a coolant supply being arranged in addition to at least one antifriction bearing.

2. Discussion of Background Information

As a rule, such deflection compensation rolls, which are also called through deflection compensation rolls, are used as an upper and/or lower roll in a roll stack of a calender with which a paper web or a comparable material web is impacted with increased pressure. The roll jacket is thereby supported in the press direction of the roll stack by hydrostatic support elements. These ensure that the roll jacket maintains a predetermined deflection line even under pressure. If necessary, the yoke is somewhat deflected given a corresponding pressurization.

The pivoting of the rolljacket relative to the yoke is made by the above-mentioned antifriction bearings. In operation the antifriction bearings are continuously lubricated with liquid, i.e., they are supplied with a lubricating oil. In order to prevent the oil from the hydrostatic support elements in the axial interior of the roll jacket and, as the case may be, also the lubricating oil of the antifriction bearings, from being discharged outside, sealing arrangements are provided which seal the cavity enclosed by the roll jacket axially outside. Since the sealing arrangements have to seal movable parts from each other, under certain circumstances a considerable frictional heat can occur, which has to be eliminated with the help of a coolant, as a rule, likewise an oil.

It has been shown that, particularly at higher rotational speeds of the roll jacket, a certain wear can be observed on the antifriction bearings that exceeds the wear to be expected for the corresponding rotational speed.

SUMMARY OF THE INVENTION

The present invention prevents wear on the antifriction bearings.

According to the invention, a deflection adjustment roll of the type mentioned at the outset includes a first disposal path for a lubricant stream from the antifriction bearings, which is separated from a second disposal path for a coolant stream from the sealing arrangement.

The observed wear on the antifriction bearings is attributed to the fact that at higher rotational speeds of the roll jacket a correspondingly higher cooling capacity is also necessary at the sealing arrangement. This cooling capacity is obtained by a larger oil stream. However, this larger supplied oil volume leads to the formation of an enclosed oil volume in the area between the antifriction bearing and the sealing arrangement, which enclosed oil volume rotates at the speed of the roll jacket. There is a danger here of the cage of the antifriction bearing, which normally rotates at about half the rotational speed of the roll jacket, being accelerated in excess of this speed. This leads to an undesirable sliding of the roll bodies in the antifriction bearing and thus to greater wear of the roll bodies. If the coolant stream is isolated from the lubricant stream on the outlet side, as is provided according to the invention, it is possible to ensure that the pressure on the side of the antifriction bearing facing the sealing arrangement does not rise above a critical level. In view of the fact that the requirement for coolant is about five times the requirement for lubricant, it is easy to see that a critical pressure load on the side of the bearing facing the sealing arrangement can be avoided by a separate disposal of these two liquid streams. Moreover, this arrangement has the advantage that the lubricant stream, that is, the circulation of the lubricating oil, and the coolant stream, that is, the circulation of the coolant, can be handled separately. It can be ensured, e.g., that the coolant stream is cooled differently from the lubricant stream. It is thus possible to create favorable conditions in each case and, e.g., to better adjust the viscosity of the lubricating oil.

A discharge device is preferably provided in the first disposal path. In this advantageous embodiment it is not enough to merely have the lubricating oil and the cooling oil flow out separately. Measures are specifically used for the lubricating oil to ensure that it is removed from the area on the axial side of the antifriction bearing.

The discharge device is advantageously embodied as a dipper. A dipper of this kind is known per se. Dippers are used to remove an oil layer that forms on the inside of the rotating roll jacket. Due to the relative speed between the dipper and the rotating roll jacket, the oil adhering to the roll jacket is pressed into the dipper at a pressure that is sufficient to propel the lubricating oil radially inwards.

Here it is particularly preferred for the dipper to feature two openings opposite each other, facing in the rotational direction of the roll jacket and connected to a discharge pipe, with a tiltable flap being arranged between the two openings, which flap, upon pressure in the one opening, closes the respective other opening. A dipper of this kind makes it possible to alter the rotational direction of the roll—while maintaining the discharge effect of the dipper at the same time—without structural alterations or intervention from outside. In principle, lubricating oil can flow into the dipper through each of the two openings. Which opening is ultimately used depends on the rotational direction of the roll jacket. The lubricating oil flows into the dipper opening which is facing opposite the rotational direction. The oil flowing in now creates a pressure on the flap that tilts the flap and thus closes the other opening. The oil thus cannot flow out of the other opening, but is pressed into the discharge pipe.

The discharge device preferably discharges lubricant at least up to a level lying radially outside the roll bodies of the antifriction bearing. It is not necessary to discharge the lubricating oil completely. In many cases this would only be possible with a relatively large technical effort. However, it is ensured that the dipper discharges the lubricating oil to the extent that it can no longer impinge on the roll bodies of the antifriction bearing, but only presses on the outer ring of the antifriction bearing.

The sealing device preferably features a sealing ring connected to the yoke and having a seal lip projecting radially outwards. The seal lip acts together with a flange that is attached to the roll jacket and essentially runs parallel to the roll jacket. When the sealing arrangement is designed in this way, the sealing arrangement needs only a comparatively small construction space. There is therefore sufficient space available to run the two disposal paths separately. The seal lip projecting radially outwards has the advantage that the sealing effect basically does not change with the increasing rotational speed of the roll jacket.

In an alternative embodiment it can be provided for the sealing arrangement to feature a sealing ring connected to the roll jacket and having a seal lip projecting radially inwards, with clamping means being provided that pressurize the seal lip against a flange on the yoke. When the sealing ring rotates with the roll jacket, the seal lip tends to lift from the flange on the yoke at increasing rotational speeds. The sealing effect of the sealing ring thus declines with increasing rotational speeds. A resulting leakage can either be accepted or clamping means can be provided that pressurize the seal lip against the flange on the yoke. These clamping means can be spring elements that draw or press the seal lip on the flange. However, hydraulic clamping means are also conceivable with which a pressure is built up on the radial outside of the seal lip in order to press the seal lip radially inwards against the flange.

Preferably at least one of the two disposal paths features a channel run in a pipe which bridges a gap between the yoke and a bearing carrier. In some cases the bearing and the sealing arrangement are not mounted directly on the yoke, but on a bearing carrier. A disposal path can be formed such that the appropriate oil flows out in the gap between the bearing carrier and the yoke and from there can be further discharged. In order to prevent an interaction with the oil from the other disposal path, this oil is guided through the pipe from the bearing carrier into the yoke.

It is particularly preferred here for the pipe to be telescopically supported in the yoke and/or in the bearing carrier. This embodiment is preferable particularly with rolls with jacket lift, in which the bearing carrier is movable relative to the yoke. In this case the changing distance between the bearing carrier and the yoke is bridged by the pipe.

A lubricant chamber, which forms a part of the first supply path, and a coolant chamber, which forms a part of the second disposal path, are preferably separated by a labyrinth gland. Both the lubricant chamber, which is adjacent to the antifriction bearing, and the coolant chamber, which is adjacent to the sealing arrangement are delimited on the one side by parts that are arranged stationary to the yoke, and on the other side by parts that rotate with the roll jacket. An appropriate seal between parts moved relative to each other must therefore be provided to separate the lubricant chamber from the coolant chamber. Such a seal can be accomplished in a particularly simple way by means of a labyrinth gland. Although a labyrinth gland is not a hermetic seal, i.e., it allows liquid from the area of higher pressure to flow into an area of lower pressure, the amount of liquid is so small that any negative impact on the pressure conditions in the respective chambers is negligible.

The present invention is directed to a deflection adjustment roll that includes a yoke, antifriction bearings, which are lubricated with a liquid, a rolljacket which is pivotably coupled to the yoke via the antifriction bearings, and a sealing arrangement coupled to a coolant supply. A first disposal path is structured and arranged to guide a lubricant stream from the antifriction bearing, and a second disposal path, which is separate from the first disposal path, is structured and arranged for guiding a coolant stream from the sealing arrangement.

According to a feature of the invention, a discharge device may be located in the first disposal path. The discharge device can include a dipper, and the dipper can include two openings arranged to face in opposite rotational directions of the roll jacket coupled to a discharge pipe. The dipper may also include a tiltable flap positioned between the two openings, in which the flap is structured and arranged, upon pressure in one of the two openings, to close the other of the two openings. Moreover, the antifriction bearing may include roll bodies and the discharge device can discharge lubricant at least up to a level that lies radially outside the roll bodies.

In accordance with another feature of the instant invention, the sealing arrangement may include a sealing ring coupled to the yoke with a seal lip projecting radially outwards.

Further, the sealing arrangement may include a sealing ring coupled to the roll jacket and may have a seal lip projecting radially inwards. Clamping elements can be structured and arranged to pressurize the seal lip against a flange on the yoke.

The yoke and a bearing carrier may be arranged to form a gap between the yoke and the bearing carrier, and a pipe can be arranged to bridge the gap. At least one of the two disposal paths can include a channel guided in the pipe. The pipe may be telescopically supported in at least one of the yoke and the bearing carrier.

According to still another feature of the invention, the roll can include a labyrinth gland, a lubricant chamber, which forms at least a part of the first disposal path, and a coolant chamber, which forms at least a part of the second disposal path. The labyrinth gland may be arranged to separate the lubricant and coolant chambers.

The present invention is directed to a process for operating a deflection adjustment roll that includes a yoke, antifriction bearings, a roll jacket, a sealing arrangement, and first and second disposal paths. The process includes pivotably coupling the roll jacket to the yoke via the antifriction bearings, lubricating the antifriction bearings with a liquid, and supplying coolant to the sealing arrangement. The process further includes guiding a lubricant stream from the antifriction bearings via a first disposal path, and guiding a coolant stream from the sealing arrangement via a second disposal path. The first disposal path is separate from the second disposal path.

In accordance with a feature of the instant invention, a discharge device can be located in the first disposal path. The discharge device can include a dipper, and the dipper may include two openings arranged to face in opposite rotational directions of the roll jacket coupled to a discharge pipe, and the process can further include rotating the roll jacket in a direction toward one of the two openings and receiving lubricant in the one opening.

According to another feature of the invention, the dipper can include two openings arranged to face in opposite rotational directions of the roll jacket coupled to a discharge pipe and a tiltable flap positioned between the two openings, and process may further include closing one of the two openings with the tiltable flap when pressure in the other of the two openings is greater than in the one opening. Moreover, the antifriction bearing can include roll bodies, and the process may further include discharging lubricant from the discharge device at least up to a level that lies radially outside the roll bodies.

According to still another feature of the instant invention, the sealing arrangement may include a sealing ring coupled to the yoke with a seal lip projecting radially outwards.

Further, the sealing arrangement can include a sealing ring coupled to the roll jacket and having a seal lip projecting radially inwards. The process may also include pressurizing the lip seal against a flange on the yoke via clamping elements.

In accordance with yet another feature of the present invention, the roll may further include a labyrinth gland, a lubricant chamber, which forms at least a part of the first disposal path, and a coolant chamber, which forms at least a part of the second disposal path. The labyrinth gland can be arranged to separate the lubricant and coolant chambers.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 2 illustrates a section II—II through the dipper depicted in FIG. 1; and

FIG. 3 illustrates a second embodiment of a bearing arrangement.

DETAILED DESCRIPTION OF THE PRESENT INVENTION

Figure 1:
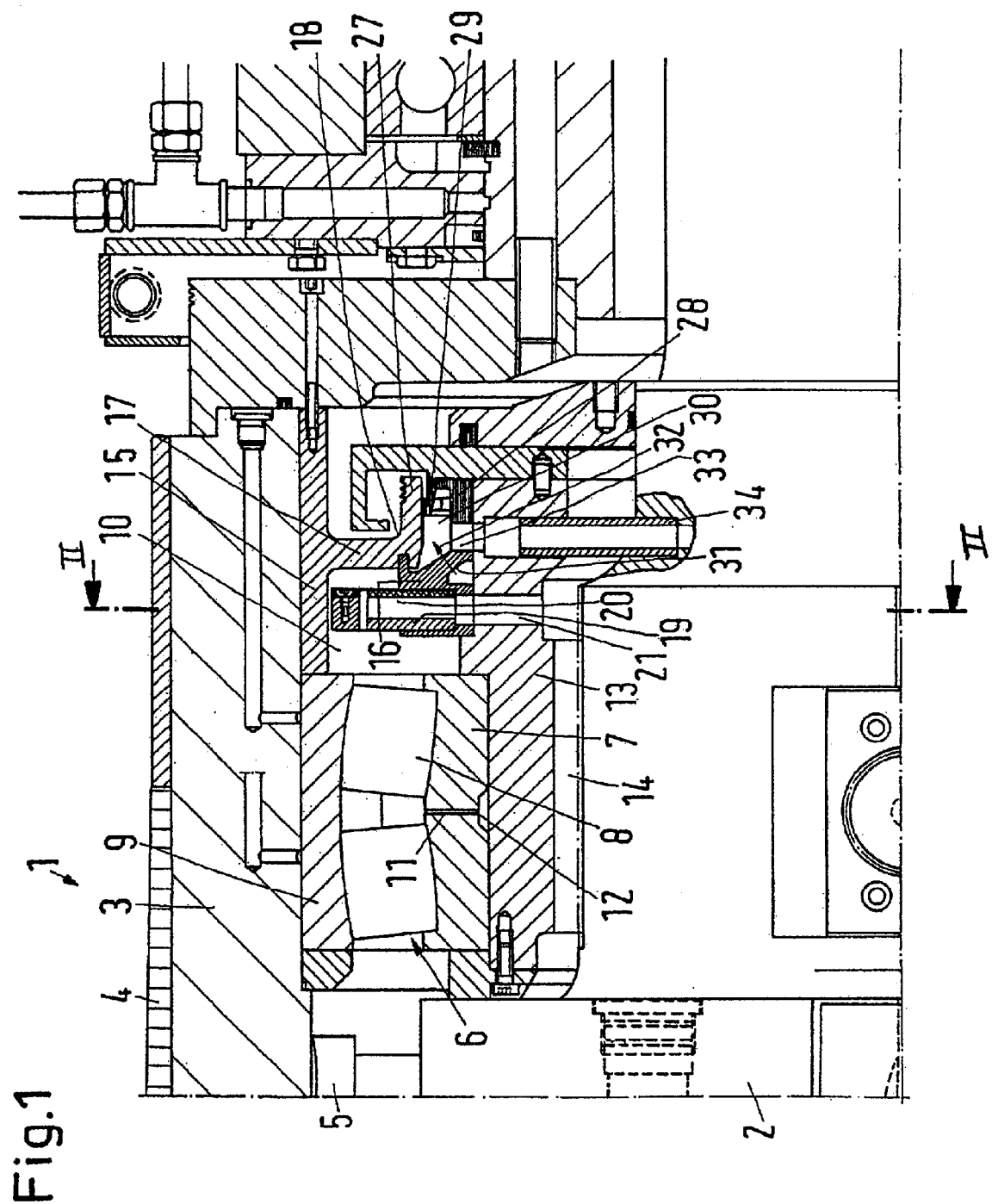
FIG. 1 illustrates a first embodiment of a bearing arrangement.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

FIG. 1 is a diagrammatic representation of a bearing arrangement at one axial end of a deflection adjustment roll 1. Deflection adjustment roll 1 features a yoke 2 which crosses a roll jacket 3 which is formed as a tube or pipe. An elastic coating 4 is arranged on the circumferential surface of roll jacket 3. Hydrostatic support elements 5 are arranged along the axial extension of the yoke 2, which support roll jacket 3 relative to yoke 2. However, support elements 5 are only able to absorb forces that act in a press direction. Roll jacket 3 is pivoted against yoke 2. To this end an antifriction bearing 6 is provided between yoke 2 and roll jacket 3, featuring an inner ring 7, roll bodies 8 and an outer ring 9. Roll bodies 8 are further linked together by a cage (not shown in detail) in the circumferential direction. In the present case, this is a self-aligning roller bearing.

Antifriction bearing 6 is lubricated with lubricating oil which is supplied via a lubricating oil channel 11 which is fed from a groove 12 on the radial inside of inner ring 7. The lubricating oil flows out axially towards both sides. A discharge device (not shown in detail) is provided on the axial inside on which support elements 5 are also arranged, which discharges the lubricating oil together with the oil flowing out of hydrostatic support elements 5.

Antifriction bearing 6 is arranged on a bearing carrier 13 that is movable relative to yoke 2 in the active direction of support elements 5. Deflection adjustment roll is accordingly formed as a roll with jacket lift according to FIG. 1. A gap 14, the height of which can be changed, can exist between bearing carrier 13 and yoke 2.

A lubricant chamber 10 is arranged on the axial outside of antifriction bearing 6, which is delimited by antifriction bearing 6, bearing carrier 13 and a flange carrier 15, which is mounted on roll jacket 3 and rotates with it. A further delimitation is formed by a dipper carrier 16, which with a radial wall 17 of flange carrier 15 projecting radially inwards, forms a labyrinth gland 18.

A dipper 19 is mounted on dipper carrier 16. The upper part of dipper 19 is represented in enlarged form in FIG. 2. A discharge pipe 20 is provided in dipper 19, which is continued in a channel in bearing carrier 13, which discharges into gap 14. Gap 14 is connected in a manner not shown in detail to a return flow pipe for the lubricating oil.

Dipper 19 represented in FIG. 2 features a head 22 in which two openings 23, 24 are provided, each facing in the rotational direction of the roll jacket and connected to discharge pipe 20. A flap 25 is arranged between two openings 23 and 24, which is tiltably mounted by via a swivel axis 26 on the head, namely from the position marked by through lines to a first position marked by dashes, in which it closes the opening 24 when pressure occurs on the opening 23, and to a second position marked by dash-dot lines, in which it closes opening 23 when lubricating oil appears under pressure at the opening 24. A changeover of dipper 19 as a function of the rotational direction of roll-jacket 3 is thus achieved, and without intervention from outside.

A flange 27, which runs essentially parallel to the roll jacket 3, is arranged on radial wall 17. A sealing ring 28, which includes a radially outwardly directed seal lip 29, acts together with flange 27. Seal lip 29 is arranged to fit closely on the radial inside against flange 27. Flange 27, sealing ring 28, bearing carrier 13 and dipper carrier 16 together delimit a coolant chamber 30, which features a supply connection 31 through which cooling oil can be conveyed under pressure against seal lip 29, as symbolized by an arrow 32. The cooling oil fills up coolant chamber 30 completely so that the cooling oil supplied displaces the cooling oil present in coolant chamber 30 through an opening 33 that is formed in bearing carrier 13. From there the cooling oil travels through a pipe 34 that is guided telescopically in bearing carrier 13 and bridges gap 14, to arrive in yoke 2 where it can be discharged via lines not depicted in detail.

Although a certain amount of cooling oil can overflow through labyrinth gland 18 from coolant chamber 30 into lubricant chamber 10, this amount is comparatively small. It does not affect the pressure conditions in lubricant chamber 10, or not to a significantly negative extent.

Lubricating oil, which is conveyed to antifriction bearing 6 in an amount of approx. 2 l/min, arrives in lubricant chamber 10 and is discharged from there with the aid of dipper 19. Dipper 19 is positioned such that it removes the oil that collects on the inside of flange carrier 15 due to centrifugal force, and does so in excess of a level at which the oil located there can impinge on roll bodies 8. Roll bodies 8 are therefore not strained by a pressure in lubricant chamber 10. Basically, no pressure builds up there at all.

However, the cooling oil which is conveyed into coolant chamber 30 in an amount of approx. 10 l/min, arrives back in the yoke through pipe 34 in a separate supply path. The circulations of cooling oil and lubricating oil are therefore isolated from each other at least in the direct vicinity of bearing 6.

Because the sealing arrangement uses a sealing ring 28 with a seal lip 29 projecting radially outwards, the sealing arrangement is very small in construction. An enlarged construction area is therefore available axially outside the antifriction bearing which can be used for separating cooling oil and lubricating oil.

FIG. 3 shows a somewhat modified embodiment in which the same parts are given the same reference numbers and corresponding parts are given crossed reference numbers.

In contrast to the embodiment according to FIG. 1, the deflection adjustment roll is no longer embodied as a jacket lift roll. Antifriction bearing 6 is supported in a stationary manner on yoke 2 without the interconnection of a bearing carrier. Accordingly, the oil removed by dipper 19 can be discharged directly into a return flow channel 35. Coolant chamber 30 is also directly connected to an outlet channel 36. Furthermore, a feed channel 37 is provided through which cooling oil is conveyed into coolant chamber 30. Otherwise the operation of this bearing arrangement is comparable with that of FIG. 1.

Sealing ring 28 can also be arranged on flange 17, if it is ensured that clamping elements are available that prevent seal lip 29 from lifting from a flange correspondingly fixed to the yoke. Such an embodiment can be used, e.g., with rolls that run more slowly.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A process for operating a deflection adjustment roll that includes a yoke, at least one antifriction bearing, a roll jacket, a sealing arrangement, and first and second disposal paths, said process comprising:

pivotably coupling the roll jacket to the yoke via the at least one antifriction bearing;

lubricating the at least one antifriction bearing with a liquid;

supplying coolant to the sealing arrangement, which is arranged axially outside of the at least one bearing;

guiding a lubricant stream from the at least one antifriction bearing via a discharge device arranged axially outside of the at least one bearing, which is located in a first disposal path; and guiding a coolant stream from the sealing arrangement via a second disposal path, wherein the first disposal path is separate from the second disposal path, and wherein the at least one antifriction bearing comprises roll bodies, and said process further comprises discharging lubricant from the discharge device at least up to a level that lies radially outside the roll bodies.

2. A process for operating a deflection adjustment roll that includes a yoke, at least one antifriction bearing, a roll jacket, a sealing arrangement, and first and second disposal paths, said process comprising:

pivotably coupling the roll jacket to the yoke via the at least one antifriction bearing;

lubricating the at least one antifriction bearing with a liquid;

supplying coolant to the sealing arrangement;

guiding a lubricant stream from the at least one antifriction bearing via a first disposal path; and guiding a coolant stream from the sealing arrangement via a second disposal path, wherein the first disposal path is separate from the second disposal path, and wherein the roll further includes:

a labyrinth gland;

a lubricant chamber, which forms at least a part of said first disposal path, and a coolant chamber, which forms at least a part of said second disposal path, wherein said labyrinth gland is arranged to separate said lubricant and coolant chambers.

3. A deflection adjustment roll comprising:

a yoke;

at least one antifriction bearing, which is lubricated with a liquid;

a roll jacket which is pivotably coupled to said yoke via said at least one antifriction bearing;

a sealing arrangement coupled to a coolant supply;

a first disposal path structured and arranged to guide a lubricant stream from said at least one antifriction bearing;

a second disposal path, which is separate from said first disposal path, structured and arranged for guiding a coolant stream from the sealing arrangement; and a discharge device located in the first disposal path, wherein said discharge device comprises a dipper.

4. The deflection adjustment roll in accordance with claim 3, wherein said dipper comprises two openings arranged to face in opposite rotational directions of said roll jacket coupled to a discharge pipe.

5. The deflection adjustment roll in accordance with claim 4, said dipper further comprising a tiltable flap positioned between said two openings, said flap being structured and arranged, upon pressure in one of said two openings, to close the other of said two openings.

6. A deflection adjustment roll comprising:

a yoke;

at least one antifriction bearing, which is lubricated with a liquid;

a roll jacket which is pivotably coupled to said yoke via said at least one antifriction bearing;

a sealing arrangement, arranged axially outside of said at least one antifriction bearing, coupled to a coolant supply, said sealing arrangement comprising at least two adjacent and relatively movable elements;

a first disposal path structured and arranged to guide a lubricant stream from said at least one antifriction bearing;

a second disposal path, which is separate from said first disposal path, structured and arranged for guiding a coolant stream from the sealing arrangement; and a discharge device, which is arranged axially outside of said at least one antifriction bearing and is located in the first disposal path, wherein said at least one antifriction bearing comprises roll bodies and said discharge device discharges lubricant at least up to a level that lies radially outside said roll bodies.

7. A deflection adjustment roll comprising:

a yoke;

at least one antifriction bearing, which are lubricated with a liquid;

a roll jacket which is pivotably coupled to said yoke via said at least one antifriction bearing;

a sealing arrangement coupled to a coolant supply;

a first disposal path structured and arranged to guide a lubricant stream from said at least one antifriction bearing; and a second disposal path, which is separate from said first disposal path, structured and arranged for guiding a coolant stream from the sealing arrangement, wherein said sealing arrangement comprises a sealing ring coupled to said yoke with a seal lip projecting radially outwards.

8. A deflection adjustment roll comprising:

a yoke;

at least one antifriction bearing, which is lubricated with a liquid;

a roll jacket which is pivotably coupled to said yoke via said at least one antifriction bearing;

a sealing arrangement, arranged axially outside of said at least one antifriction bearing, coupled to a coolant supply, said sealing arrangement comprising at least two adjacent and relatively movable elements;

a first disposal path structured and arranged to guide a lubricant stream from said at least one antifriction bearing;

a second disposal path, which is separate from said first disposal path, structured and arranged for guiding a coolant stream from the sealing arrangement; and a discharge device, which is arranged axially outside of said at least one antifriction bearing and is located in the first disposal path, wherein said at least two adjacent and relatively movable elements comprises a sealing ring coupled to said roll jacket having a seal lip projecting radially outwards.

9. The deflection adjustment roll in accordance with claim 8, further comprising clamping elements structured and arranged to pressurize said seal lip against a flange on said yoke.

10. A deflection adjustment roll comprising:

a yoke;

at least antifriction bearing, which are lubricated with a liquid;

a roll jacket which is pivotably coupled to said yoke via said at least one antifriction bearing;

a sealing arrangement coupled to a coolant supply;

a first disposal path structured and arranged to guide a lubricant stream from said at least one antifriction bearing; and a second disposal path, which is separate from said first disposal path, structured and arranged for guiding a coolant stream from the sealing arrangement, wherein said yoke and a bearing carrier are arranged to form a gap between said yoke and said bearing carrier, and a pipe is arranged to bridge said gap, and wherein at least one of said two disposal paths comprise a channel guided in said pipe.

11. The deflection adjustment roll in accordance with claim 10, wherein said pipe is telescopically supported in at least one of said yoke and said bearing carrier.

12. A process for operating a deflection adjustment roll that includes a yoke, at least one antifriction bearing, a roll jacket, a sealing arrangement, and first and second disposal paths, said process comprising:

pivotably coupling the roll jacket to the yoke via the at least one antifriction bearing;

lubricating the at least one antifriction bearing with a liquid;

supplying coolant to the sealing arrangement;

guiding a lubricant stream from the at least one antifriction bearing via a first disposal path; and guiding a coolant stream from the sealing arrangement via a second disposal path, wherein the first disposal path is separate from the second disposal path, wherein a discharge device is located in the first disposal path, and wherein the discharge device comprises a dipper.

13. The process in accordance with claim 12, wherein the dipper comprises two openings arranged to face in opposite rotational directions of said roll jacket coupled to a discharge pipe, and said process further comprises:

rotating the roll jacket in a direction toward one of the two openings; and receiving lubricant in the one opening.

14. The process in accordance with claim 12, wherein the dipper comprises two openings arranged to face in opposite rotational directions of said roll jacket coupled to a discharge pipe, and a tiltable flap positioned between the two openings, and process further comprises:

closing one of the two openings with the tiltable flap when pressure in the other of said two openings is greater than in the one opening.

15. A process for operating a deflection adjustment roll that includes a yoke, at least one antifriction bearing, a roll jacket, a sealing arrangement, and first and second disposal paths, said process comprising:

pivotably coupling the roll jacket to the yoke via the at least one antifriction bearing;

lubricating the at least one antifriction bearing with a liquid;

supplying coolant to the sealing arrangement;

guiding a lubricant stream from the at least one antifriction bearing via a first disposal path; and guiding a coolant stream from the sealing arrangement via a second disposal path, wherein the first disposal path is separate from the second disposal path, and wherein said sealing arrangement comprises a sealing ring coupled to said roll jacket and having a seal lip projecting radially outwards.

16. The process in accordance with claim 15, further comprising pressurizing the lip seal against a flange on the yoke via clamping elements.

17. A process for operating a deflection adjustment roll that includes a yoke, at least one antifriction bearing, a roll jacket, a sealing arrangement, and first and second disposal paths, said process comprising:

pivotably coupling the roll jacket to the yoke via the at least one antifriction bearing;

lubricating the at least one antifriction bearing with a liquid;

supplying coolant to the sealing arrangement;

guiding a lubricant stream from the at least one antifriction bearing via a first disposal path; and guiding a coolant stream from the sealing arrangement via a second disposal path, wherein the first disposal path is separate from the second disposal path, and wherein said sealing arrangement comprises a sealing ring coupled to said yoke with a seal lip projecting radially outwards.

18. A deflection adjustment roll comprising:

a yoke;

at least one antifriction bearing, which are lubricated with a liquid;

a roll jacket which is pivotably coupled to said yoke via said at least one antifriction bearing;

a sealing arrangement coupled to a coolant supply;

a first disposal path structured and arranged to guide a lubricant stream from said at least one antifriction bearing;

a second disposal path, which is separate from said first disposal path, structured and arranged for guiding a coolant stream from the sealing arrangement;

a labyrinth gland;

a lubricant chamber, which forms at least a part of said first disposal path, and a coolant chamber, which forms at least a part of said second disposal path, wherein said labyrinth gland is arranged to separate said lubricant and coolant chambers.

* * * * *